United States Patent
Niemelä et al.

(10) Patent No.: US 10,115,227 B2
(45) Date of Patent: Oct. 30, 2018

(54) DIGITAL VIDEO RENDERING

(71) Applicant: Nokia Technologies Oy, Espoo (FI)

(72) Inventors: Marko Niemelä, Tampere (FI); Kim Gronholm, Helsinki (FI); Andrew Baldwin, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/529,652

(22) PCT Filed: Dec. 3, 2014

(86) PCT No.: PCT/FI2014/050946
§ 371 (c)(1),
(2) Date: May 25, 2017

(87) PCT Pub. No.: WO2016/087702
PCT Pub. Date: Jun. 9, 2016

(65) Prior Publication Data
US 2017/0330369 A1    Nov. 16, 2017

(51) Int. Cl.
*G06T 15/20* (2011.01)
*G06T 15/40* (2011.01)
*G06T 15/50* (2011.01)
*H04N 13/128* (2018.01)
*H04N 13/15* (2018.01)

(52) U.S. Cl.
CPC .......... *G06T 15/20* (2013.01); *G06T 15/205* (2013.01); *G06T 15/40* (2013.01); *G06T 15/503* (2013.01); *G06T 2210/61* (2013.01); *H04N 13/128* (2018.05); *H04N 13/15* (2018.05)

(58) Field of Classification Search
CPC ..... G06T 15/20; G06T 15/205; G06T 15/503; G06T 15/40; G06T 2210/61; H04N 13/15; H04N 13/128
See application file for complete search history.

(56) References Cited

U.S. PATENT DOCUMENTS

| | | |
|---|---|---|
| 2007/0126753 A1 | 6/2007 | Moore et al. |
| 2008/0079719 A1 | 4/2008 | Woo |
| 2008/0094395 A1 | 4/2008 | Woo et al. |

FOREIGN PATENT DOCUMENTS

| | | |
|---|---|---|
| CN | 1853200 A | 10/2006 |
| CN | 102204262 A | 9/2011 |

(Continued)

OTHER PUBLICATIONS

International Search Report and Written Opinion received for corresponding Patent Cooperation Treaty Application No. PCT/FI2014/050946, dated Apr. 29, 2015, 12 pages.

(Continued)

*Primary Examiner* — Maurice L. McDowell, Jr.
(74) *Attorney, Agent, or Firm* — Nokia Technologies Oy

(57) ABSTRACT

The invention relates to methods, apparatuses and computer program products for rendering of digital image and video content. First information of a first graphic object for rendering a second graphic object and second information of the second graphic object for rendering the second graphic object are formed or received. Dependency information between the first and second graphic objects is formed or received, where the dependency information comprises information for rendering the second graphic object depending on overlapping of said first graphic object and the second graphic object in a viewing direction. The second graphic object is rendered by creating second pixel data using the second information of the second graphic object and the first information of the first graphic object, where the rendering of the second graphic object is carried out for such part of the second graphic object that is overlapped by the first graphic object in the viewing direction.

20 Claims, 11 Drawing Sheets

(56) References Cited

FOREIGN PATENT DOCUMENTS

| EP | 2180449 A1 | 4/2010 |
|---|---|---|
| EP | 2340527 B1 | 9/2013 |
| JP | H1094678 A | 4/1998 |
| JP | 2001307128 A | 11/2001 |
| JP | 2005149209 A | 6/2005 |
| JP | 2012506573 A | 3/2012 |

OTHER PUBLICATIONS

Cohen-Or et al., "A Survey of Visibility for Walkthrough Applications", IEEE Transactions on Visualization and Computer Graphics, vol. 9, No. 3, Jul.-Sep. 2003, pp. 412-431.

Office action received for corresponding Chinese Patent Application No. 201480083825.2, dated May 16, 2018, 5 pages of office action and 3 pages of translation available.

Partial Supplementary European Search Report received for corresponding European Patent Application No. 14907391.8, dated Jun. 26, 2018, 19 pages.

Szeliski et al., "From 2D Images to 2.5D Sprites: A Layered Approach to Modeling 3D Scenes", Proceedings IEEE International Conference on Multimedia Computing and Systems, vol. 1, Jun. 7-11, 1999, pp. 44-50.

Cheng et al., "A Multi-View Video Coding Approach Using Layered Depth Image", IEEE 9th Workshop on Multimedia Signal Processing, Oct. 1-3, 2007, pp. 143-146.

Office action received for corresponding Japanese Patent Application No. 2017-528435, dated Aug. 27, 2018, 5 pages of office action and 4 pages of translation available.

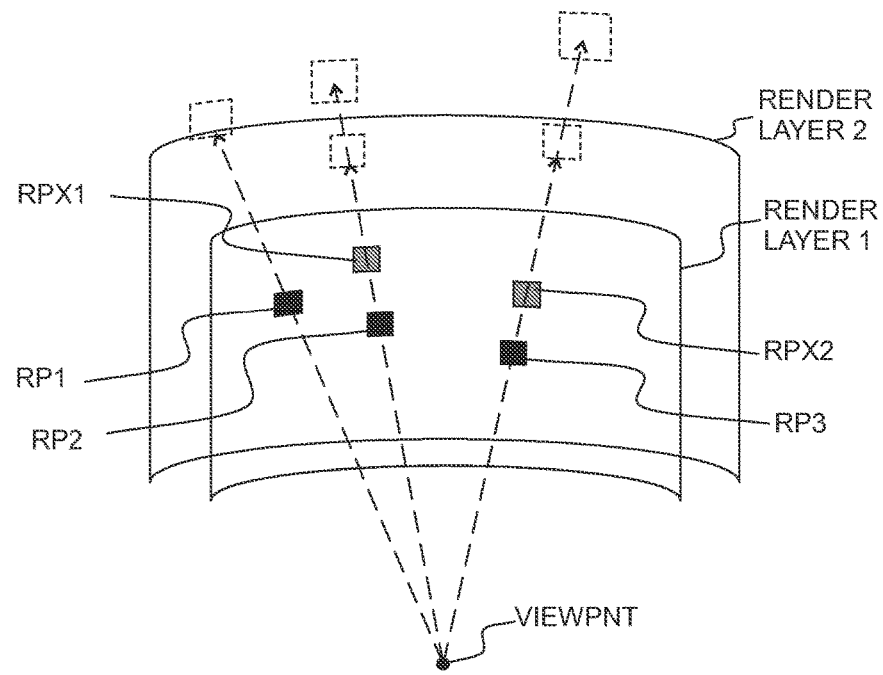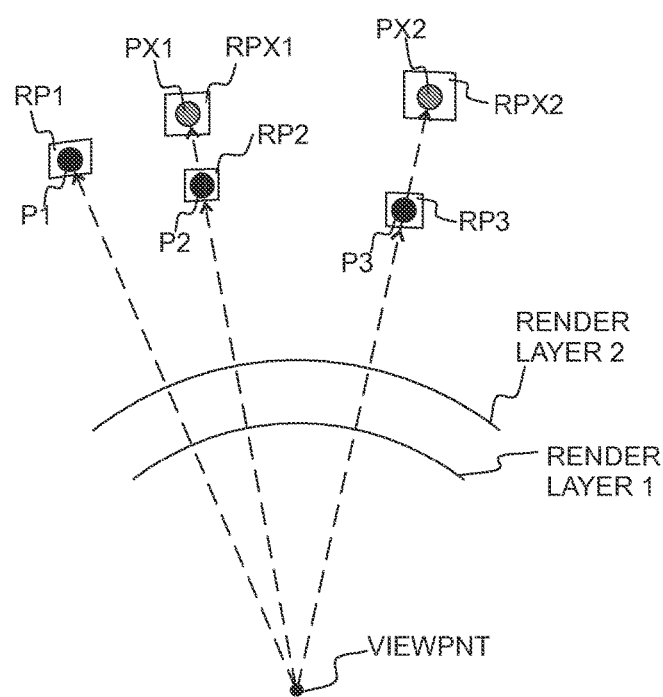

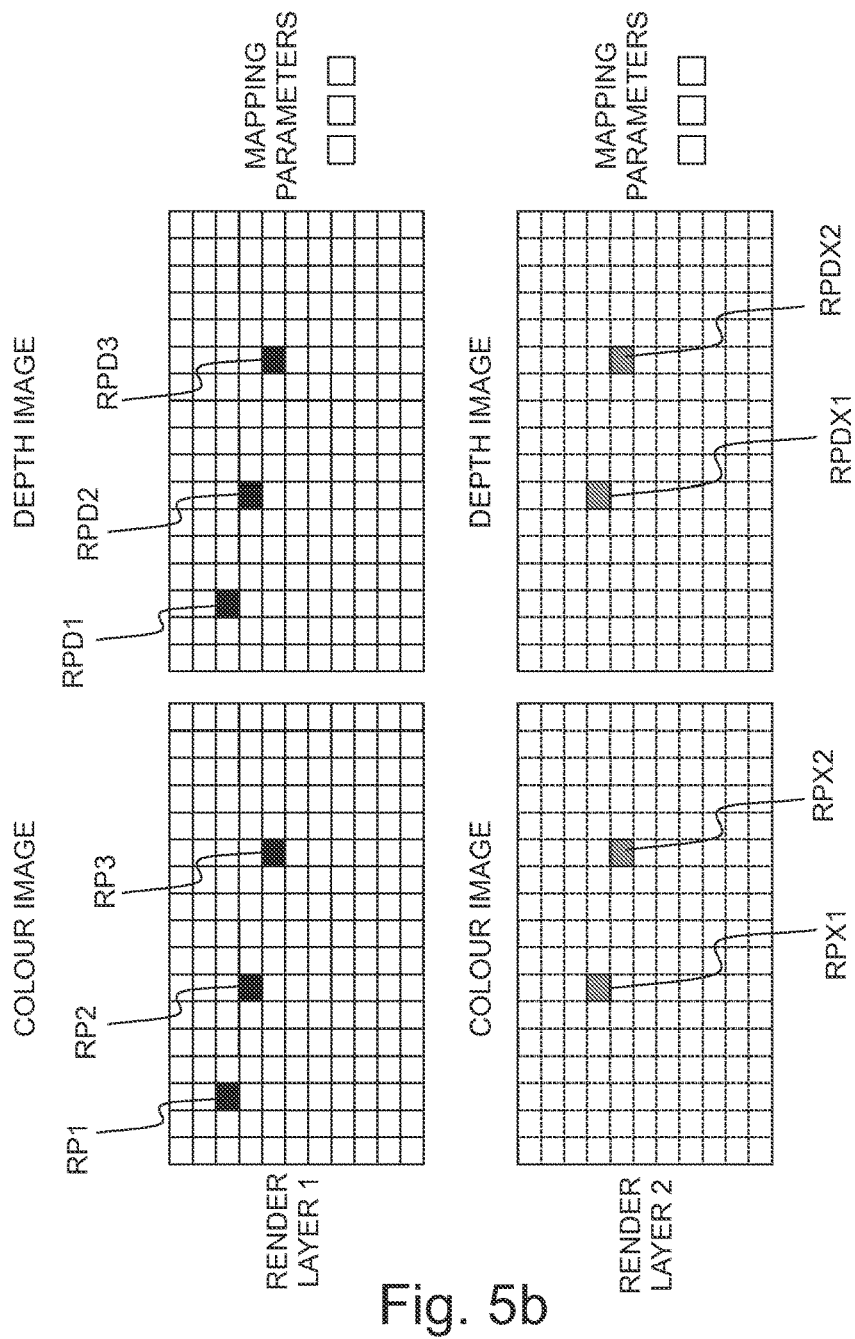

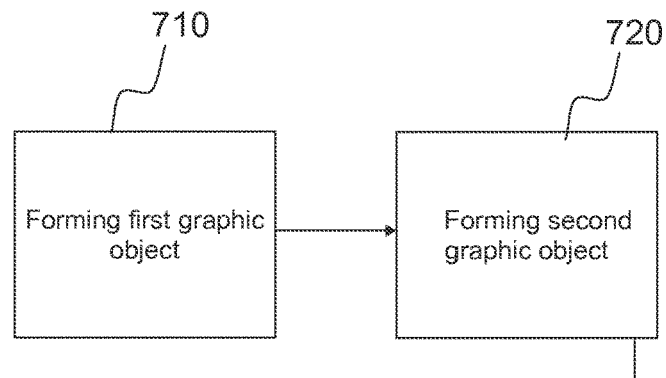
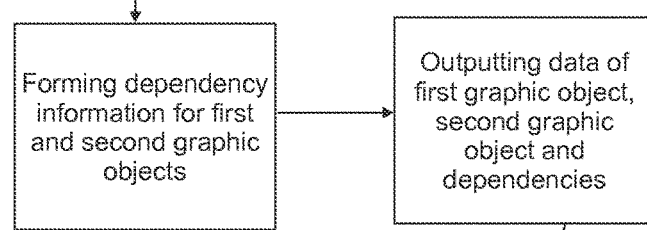
Fig. 7a
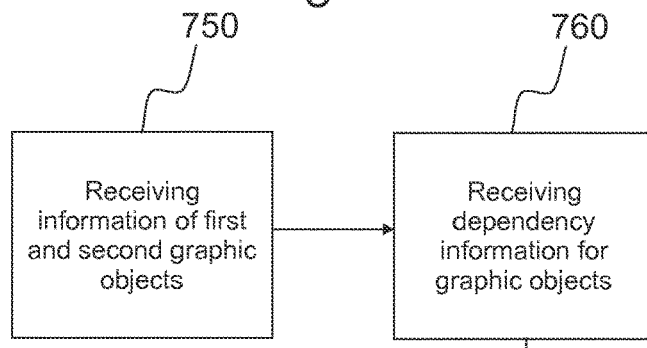
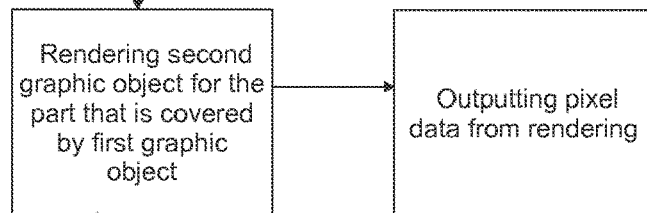
Fig. 7b

DIGITAL VIDEO RENDERING

RELATED APPLICATION

This application was originally filed as Patent Cooperation Treaty Application No. PCT/FI2014/050946 filed Dec. 3, 2014.

BACKGROUND

Digital stereo viewing of still and moving images has become commonplace, and equipment for viewing 3D (three-dimensional) movies is more widely available. Theatres are offering 3D movies based on viewing the movie with special glasses that ensure the viewing of different images for the left and right eye for each frame of the movie. The same approach has been brought to home use with 3D-capable players and television sets. In practice, the movie consists of two views to the same scene, one for the left eye and one for the right eye. These views have been created by capturing the movie with a special stereo camera that directly creates this content suitable for stereo viewing. When the views are presented to the two eyes, the human visual system creates a 3D view of the scene. This technology has the drawback that the viewing area (movie screen or television) only occupies part of the field of vision, and thus the experience of 3D view is limited.

For a more realistic experience, devices occupying a larger viewing area of the total field of view have been created. There are available special stereo viewing goggles that are meant to be worn on the head so that they cover the eyes and display pictures for the left and right eye with a small screen and lens arrangement. Such technology has also the advantage that it can be used in a small space, and even while on the move, compared to fairly large TV sets commonly used for 3D viewing.

There is, therefore, a need for solutions that enable recording and rendering of digital images/video for the purpose of viewing of a 3D video.

SUMMARY

Now there has been invented an improved method and technical equipment implementing the method, by which the above problems are alleviated. Various aspects of the invention include a method, an apparatus, a server, a renderer, a data structure and a computer readable medium comprising a computer program stored therein, which are characterized by what is stated in the independent claims. Various embodiments of the invention are disclosed in the dependent claims.

The present description discloses methods, apparatuses and computer program products for rendering of digital image and video content. First information of a first graphic object for rendering a second graphic object and second information of the second graphic object for rendering the second graphic object are formed or received. Dependency information between the first and second graphic objects is formed or received, where the dependency information comprises information for rendering the second graphic object depending on overlapping of said first graphic object and the second graphic object in a viewing direction. The second graphic object is rendered by creating second pixel data using the second information of the second graphic object and the first information of the first graphic object, where the rendering of the second graphic object is carried out for such part of the second graphic object that is overlapped by the first graphic object in the viewing direction.

In other words, there are provided methods, apparatuses and computer program products where some objects in a computer model of a scene are rendered to a computer image comprising pixels when the objects are seen through other objects, but not otherwise. For example, a model of a lamp inside a house can be seen through the window but not through the wall. In addition, if the model of the house only contains the front (façade) wall, the lamp is prevented from being rendered even though it were visible on the side of the wall when the house is viewed from an oblique angle from the side. Also, transparent objects like mirrors may be rendered by rendering a mirror image of another object in the mirror when the other object would be seen in the mirror in the current viewing direction. This simplifies rendering, because the mirror image objects may be pre-computed. However, the mirror image of the other object will not be rendered when it would be visible on the side of the mirror, because that would falsely show a reflection where there is none. The rendering of objects through other objects may be controlled so that the objects are only rendered when they are overlapped by the front objects and can be seen through the front objects. A stencil buffer may be used for such conditional rendering—pixel data is output to the picture buffer if the stencil buffer pixel for that picture buffer pixel is set appropriately.

DESCRIPTION OF THE DRAWINGS

In the following, various embodiments of the invention will be described in more detail with reference to the appended drawings, in which In the following, various embodiments of the invention will be described in more detail with reference to the appended drawings, in which

FIG. 4 illustrates rendering images using render layers;

FIGS. 5a and 5b depict data structures comprising render layers for rendering an image;

FIGS. 7a and 7b show flow charts for forming and rendering a digital scene with reflective objects.

DESCRIPTION OF EXAMPLE EMBODIMENTS

In the following, several embodiments of the invention will be described in the context of stereo viewing. It is to be noted, however, that the invention is not limited to any specific purpose. In fact, the different embodiments have applications in any environment where viewing of digital scenes with reflective surfaces is required, for example movies and television.

Figure 1A:
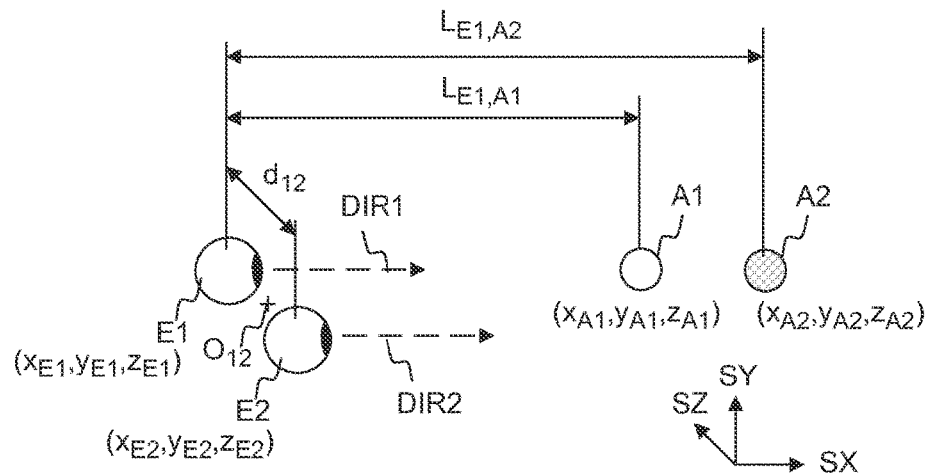
FIGS. 1a, 1b, 1c and 1d show a setup for forming a stereo image to a user.

FIGS. 1a, 1b, 1c and 1d show a setup for forming a stereo image to a user. In FIG. 1a, a situation is shown where a human being is viewing two spheres A1 and A2 using both eyes E1 and E2. The sphere A1 is closer to the viewer than the sphere A2, the respective distances to the first eye E1 being LE1,A1 and LE1,A2. The different objects reside in space at their respective (x,y,z) coordinates, defined by the coordinate system SZ, SY and SZ. The distance d12 between the eyes of a human being may be approximately 62-64 mm on average, and varying from person to person between 55 and 74 mm. This distance is referred to as the parallax, on which stereoscopic view of the human vision is based on. The viewing directions (optical axes) DIR1 and DIR2 are typically essentially parallel, possibly having a small deviation from being parallel, and define the field of view for the eyes. The head of the user has an orientation (head orientation) in relation to the surroundings, most easily defined by the common direction of the eyes when the eyes are looking straight ahead. That is, the head orientation tells the yaw, pitch and roll of the head in respect of a coordinate system of the scene where the user is.

In the setup of FIG. 1a, the spheres A1 and A2 are in the field of view of both eyes. The center-point O12 between the eyes and the spheres are on the same line. That is, from the center-point, the sphere A2 is behind the sphere A1. However, each eye sees part of sphere A2 from behind A1, because the spheres are not on the same line of view from either of the eyes.

Figure 1B:
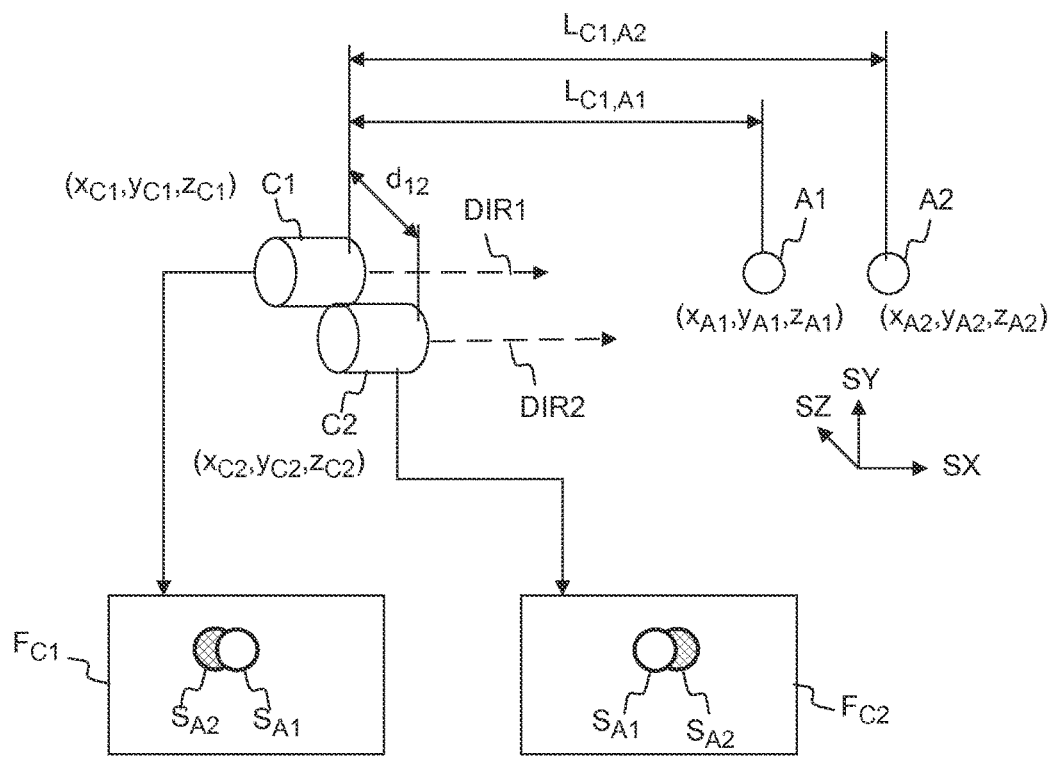

In FIG. 1b, there is a setup shown, where the eyes have been replaced by cameras C1 and C2, positioned at the location where the eyes were in FIG. 1a. The distances and directions of the setup are otherwise the same. Naturally, the purpose of the setup of FIG. 1b is to be able to take a stereo image of the spheres A1 and A2. The two images resulting from image capture are FC1 and FC2. The "left eye" image FC1 shows the image SA2 of the sphere A2 partly visible on the left side of the image SA1 of the sphere A1. The "right eye" image FC2 shows the image SA2 of the sphere A2 partly visible on the right side of the image SA1 of the sphere A1. This difference between the right and left images is called disparity, and this disparity, being the basic mechanism with which the human visual system determines depth information and creates a 3D view of the scene, can be used to create an illusion of a 3D image.

In this setup of FIG. 1b, where the inter-eye distances correspond to those of the eyes in FIG. 1a, the camera pair C1 and C2 has a natural parallax, that is, it has the property of creating natural disparity in the two images of the cameras. Natural disparity may be understood to be created even though the distance between the two cameras forming the stereo camera pair is somewhat smaller or larger than the normal distance (parallax) between the human eyes, e.g. essentially between 40 mm and 100 mm or even 30 mm and 120 mm.

Figure 1C:
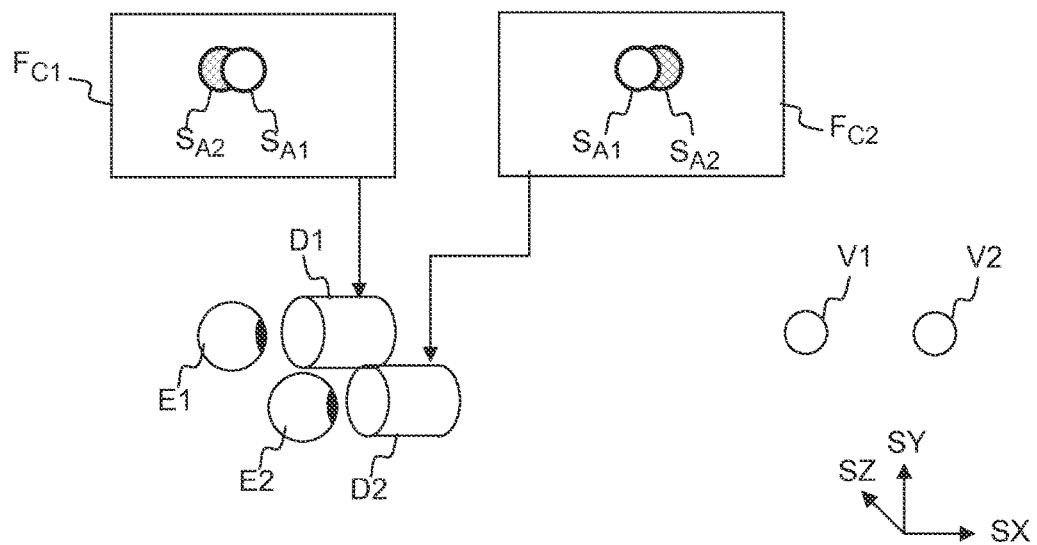

In FIG. 1c, the creating of this 3D illusion is shown. The images FC1 and FC2 captured by the cameras C1 and C2 are displayed to the eyes E1 and E2, using displays D1 and D2, respectively. The disparity between the images is processed by the human visual system so that an understanding of depth is created. That is, when the left eye sees the image SA2 of the sphere A2 on the left side of the image SA1 of sphere A1, and respectively the right eye sees the image of A2 on the right side, the human visual system creates an understanding that there is a sphere V2 behind the sphere V1 in a three-dimensional world. Here, it needs to be understood that the images FC1 and FC2 can also be synthetic, that is, created by a computer. If they carry the disparity information, synthetic images will also be seen as three-dimensional by the human visual system. That is, a pair of computer-generated images can be formed so that they can be used as a stereo image.

Figure 1D:
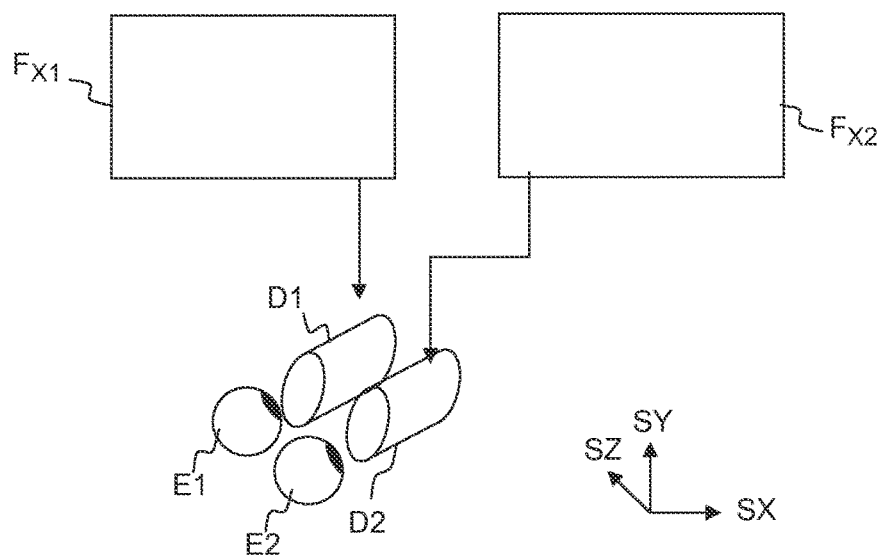

FIG. 1d illustrates how the principle of displaying stereo images to the eyes can be used to create 3D movies or virtual reality scenes having an illusion of being three-dimensional. The images FX1 and FX2 are either captured with a stereo camera or computed from a model so that the images have the appropriate disparity. By displaying a large number (e.g. 30) frames per second to both eyes using display D1 and D2 so that the images between the left and the right eye have disparity, the human visual system will create a cognition of a moving, three-dimensional image. When the camera is turned, or the direction of view with which the synthetic images are computed is changed, the change in the images creates an illusion that the direction of view is changing, that is, the viewer's head is rotating. This direction of view, that is, the head orientation, may be determined as a real orientation of the head e.g. by an orientation detector mounted on the head, or as a virtual orientation determined by a control device such as a joystick or mouse that can be used to manipulate the direction of view without the user actually moving his head. That is, the term "head orientation" may be used to refer to the actual, physical orientation of the user's head and changes in the same, or it may be used to refer to the virtual direction of the user's view that is determined by a computer program or a computer input device.

Figure 2A:
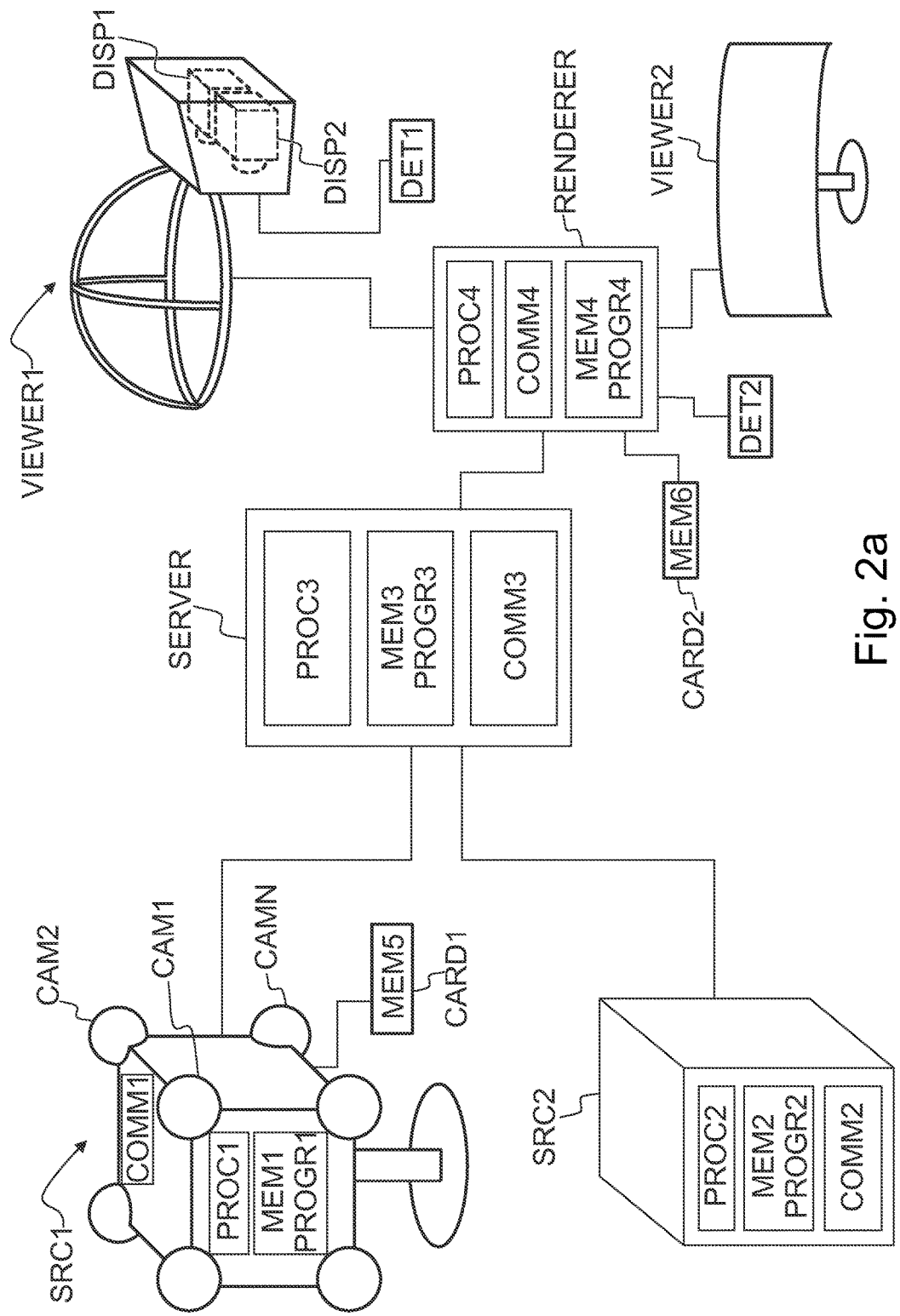
FIG. 2a shows a system and apparatuses for stereo viewing.

FIG. 2a shows a system and apparatuses for stereo viewing, that is, for 3D video and 3D audio digital capture and playback. The task of the system is that of capturing sufficient visual and auditory information from a specific location such that a convincing reproduction of the experience, or presence, of being in that location can be achieved by one or more viewers physically located in different locations and optionally at a time later in the future. Such reproduction requires more information than can be captured by a single camera or microphone, in order that a viewer can determine the distance and location of objects within the scene using their eyes and their ears. As explained in the context of FIGS. 1a to 1d, to create a pair of images with disparity, two camera sources are used. In a similar manned, for the human auditory system to be able to sense the direction of sound, at least two microphones are used (the commonly known stereo sound is created by recording two audio channels). The human auditory system can detect the cues e.g. in timing difference of the audio signals to detect the direction of sound.

The system of FIG. 2a may consist of three main parts: image sources, a server and a rendering device. A video capture device SRC1 comprises multiple (for example, 8) cameras CAM1, CAM2, . . . , CAMN with overlapping field of view so that regions of the view around the video capture device is captured from at least two cameras. The device SRC1 may comprise multiple microphones to capture the timing and phase differences of audio originating from different directions. The device may comprise a high resolution orientation sensor so that the orientation (direction of view) of the plurality of cameras can be detected and recorded. The device SRC1 comprises or is functionally connected to a computer processor PROC1 and memory MEM1, the memory comprising computer program PROGR1 code for controlling the capture device. The image stream captured by the device may be stored on a memory device MEM2 for use in another device, e.g. a viewer, and/or transmitted to a server using a communication interface COMM1.

It needs to be understood that although an 8-camera-cubical setup is described here as part of the system, another camera device may be used instead as part of the system.

Alternatively or in addition to the video capture device SRC1 creating an image stream, or a plurality of such, one or more sources SRC2 of synthetic images may be present in the system. Such sources of synthetic images may use a computer model of a virtual world to compute the various image streams it transmits. For example, the source SRC2 may compute N video streams corresponding to N virtual cameras located at a virtual viewing position. When such a synthetic set of video streams is used for viewing, the viewer may see a three-dimensional virtual world, as explained earlier for FIG. 1d. The device SRC2 comprises or is functionally connected to a computer processor PROC2 and memory MEM2, the memory comprising computer program PROGR2 code for controlling the synthetic source device SRC2. The image stream captured by the device may be stored on a memory device MEM5 (e.g. memory card CARD1) for use in another device, e.g. a viewer, or transmitted to a server or the viewer using a communication interface COMM2.

There may be a storage, processing and data stream serving network in addition to the capture device SRC1. For example, there may be a server SERV or a plurality of servers storing the output from the capture device SRC1 or computation device SRC2. The device comprises or is functionally connected to a computer processor PROC3 and memory MEM3, the memory comprising computer program PROGR3 code for controlling the server. The server may be connected by a wired or wireless network connection, or both, to sources SRC1 and/or SRC2, as well as the viewer devices VIEWER1 and VIEWER2 over the communication interface COMM3.

For viewing the captured or created video content, there may be one or more viewer devices VIEWER1 and VIEWER2. These devices may have a rendering module and a display module, or these functionalities may be combined in a single device. The devices may comprise or be functionally connected to a computer processor PROC4 and memory MEM4, the memory comprising computer program PROGR4 code for controlling the viewing devices. The viewer (playback) devices may consist of a data stream receiver for receiving a video data stream from a server and for decoding the video data stream. The data stream may be received over a network connection through communications interface COMM4, or from a memory device MEM6 like a memory card CARD2. The viewer devices may have a graphics processing unit for processing of the data to a suitable format for viewing as described with FIGS. 1c and 1d. The viewer VIEWER1 comprises a high-resolution stereo-image head-mounted display for viewing the rendered stereo video sequence. The head-mounted device may have an orientation sensor DET1 and stereo audio headphones. The viewer VIEWER2 comprises a display enabled with 3D technology (for displaying stereo video), and the rendering device may have a head-orientation detector DET2 connected to it. Any of the devices (SRC1, SRC2, SERVER, RENDERER, VIEWER1, VIEWER2) may be a computer or a portable computing device, or be connected to such. Such rendering devices may have computer program code for carrying out methods according to various examples described in this text.

Figure 2B:
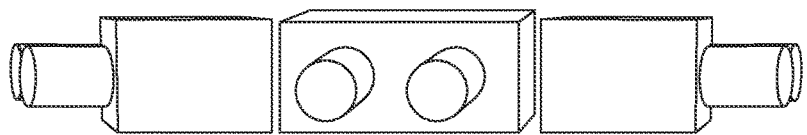
FIG. 2b shows a stereo camera device for stereo viewing.

FIG. 2b shows a camera device for stereo viewing. The camera comprises three or more cameras that are configured into camera pairs for creating the left and right eye images, or that can be arranged to such pairs. The distance between cameras may correspond to the usual distance between the human eyes. The cameras may be arranged so that they have significant overlap in their field-of-view. For example, wide-angle lenses of 180 degrees or more may be used, and there may be 3, 4, 5, 6, 7, 8, 9, 10, 12, 16 or 20 cameras. The cameras may be regularly or irregularly spaced across the whole sphere of view, or they may cover only part of the whole sphere. For example, there may be three cameras arranged in a triangle and having a different directions of view towards one side of the triangle such that all three cameras cover an overlap area in the middle of the directions of view. As another example, 8 cameras having wide-angle lenses and arranged regularly at the corners of a virtual cube and covering the whole sphere such that the whole or essentially whole sphere is covered at all directions by at least 3 or 4 cameras. In FIG. 2b, three stereo camera pairs are shown.

Camera devices with other types of camera layouts may be used. For example, a camera device with all the cameras in one hemisphere may be used. The number of cameras may be e.g. 3, 4, 6, 8, 12, or more. The cameras may be placed to create a central field of view where stereo images can be formed from image data of two or more cameras, and a peripheral (extreme) field of view where one camera covers the scene and only a normal non-stereo image can be formed. Examples of different camera devices that may be used in the system are described also later in this description.

Figure 2C:
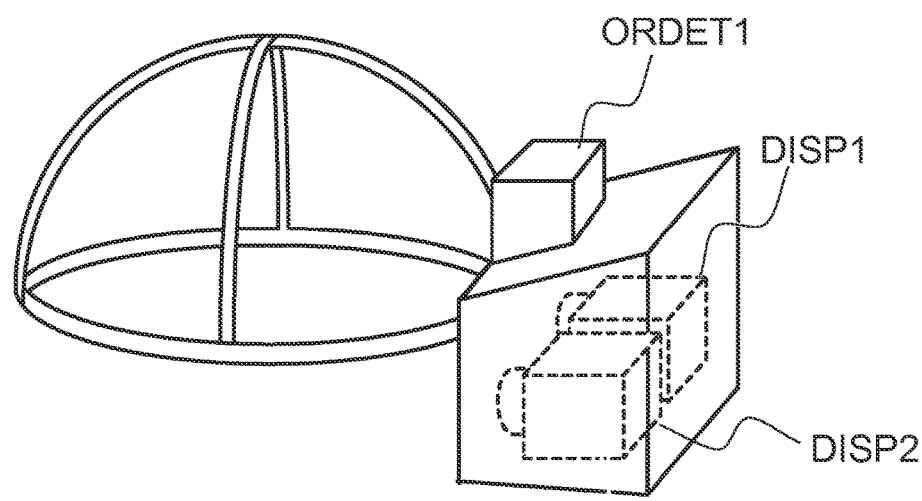
FIG. 2c shows a head-mounted display for stereo viewing.

FIG. 2c shows a head-mounted display for stereo viewing. The head-mounted display contains two screen sections or two screens DISP1 and DISP2 for displaying the left and right eye images. The displays are close to the eyes, and therefore lenses are used to make the images easily viewable and for spreading the images to cover as much as possible of the eyes' field of view. The device is attached to the head of the user so that it stays in place even when the user turns his head. The device may have an orientation detecting module ORDET1 for determining the head movements and direction of the head. It is to be noted here that in this type of a device, tracking the head movement may be done, but since the displays cover a large area of the field of view, eye movement detection is not necessary. The head orientation may be related to real, physical orientation of the user's head, and it may be tracked by a sensor for determining the real orientation of the user's head. Alternatively or in addition, head orientation may be related to virtual orientation of the user's view direction, controlled by a computer program or by a computer input device such as a joystick. That is, the user may be able to change the determined head orientation with an input device, or a computer program may change the view direction (e.g. in gaming, the game program may control the determined head orientation instead or in addition to the real head orientation.

Figure 2D:
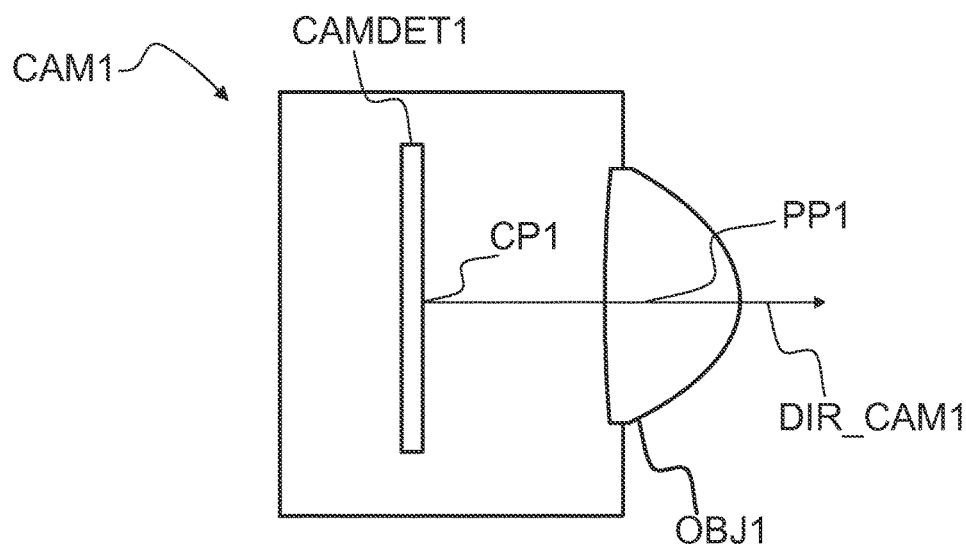
FIG. 2d illustrates a camera.

FIG. 2d illustrates a camera CAM1. The camera has a camera detector CAMDET1, comprising a plurality of sensor elements for sensing intensity of the light hitting the sensor element. The camera has a lens OBJ1 (or a lens arrangement of a plurality of lenses), the lens being positioned so that the light hitting the sensor elements travels through the lens to the sensor elements. The camera detector CAMDET1 has a nominal center point CP1 that is a middle point of the plurality of sensor elements, for example for a rectangular sensor the crossing point of the diagonals. The lens has a nominal center point PP1, as well, lying for example on the axis of symmetry of the lens. The direction of orientation of the camera is defined by the line passing through the center point CP1 of the camera sensor and the center point PP1 of the lens. The direction of the camera is a vector along this line pointing in the direction from the camera sensor to the lens. The optical axis of the camera is understood to be this line CP1-PP1.

The system described above may function as follows. Time-synchronized video, audio and orientation data is first recorded with the capture device. This can consist of multiple concurrent video and audio streams as described above. These are then transmitted immediately or later to the storage and processing network for processing and conversion into a format suitable for subsequent delivery to playback devices. The conversion can involve post-processing steps to the audio and video data in order to improve the quality and/or reduce the quantity of the data while preserving the quality at a desired level. Finally, each playback device receives a stream of the data from the network, and renders it into a stereo viewing reproduction of the original location which can be experienced by a user with the head mounted display and headphones.

With a novel way to create the stereo images for viewing as described below, the user may be able to turn their head in multiple directions, and the playback device is able to create a high-frequency (e.g. 60 frames per second) stereo video and audio view of the scene corresponding to that specific orientation, for example as it would have appeared from the location of the original recording. Other methods of creating the stereo images for viewing from the camera data may be used, as well.

Figure 3A:
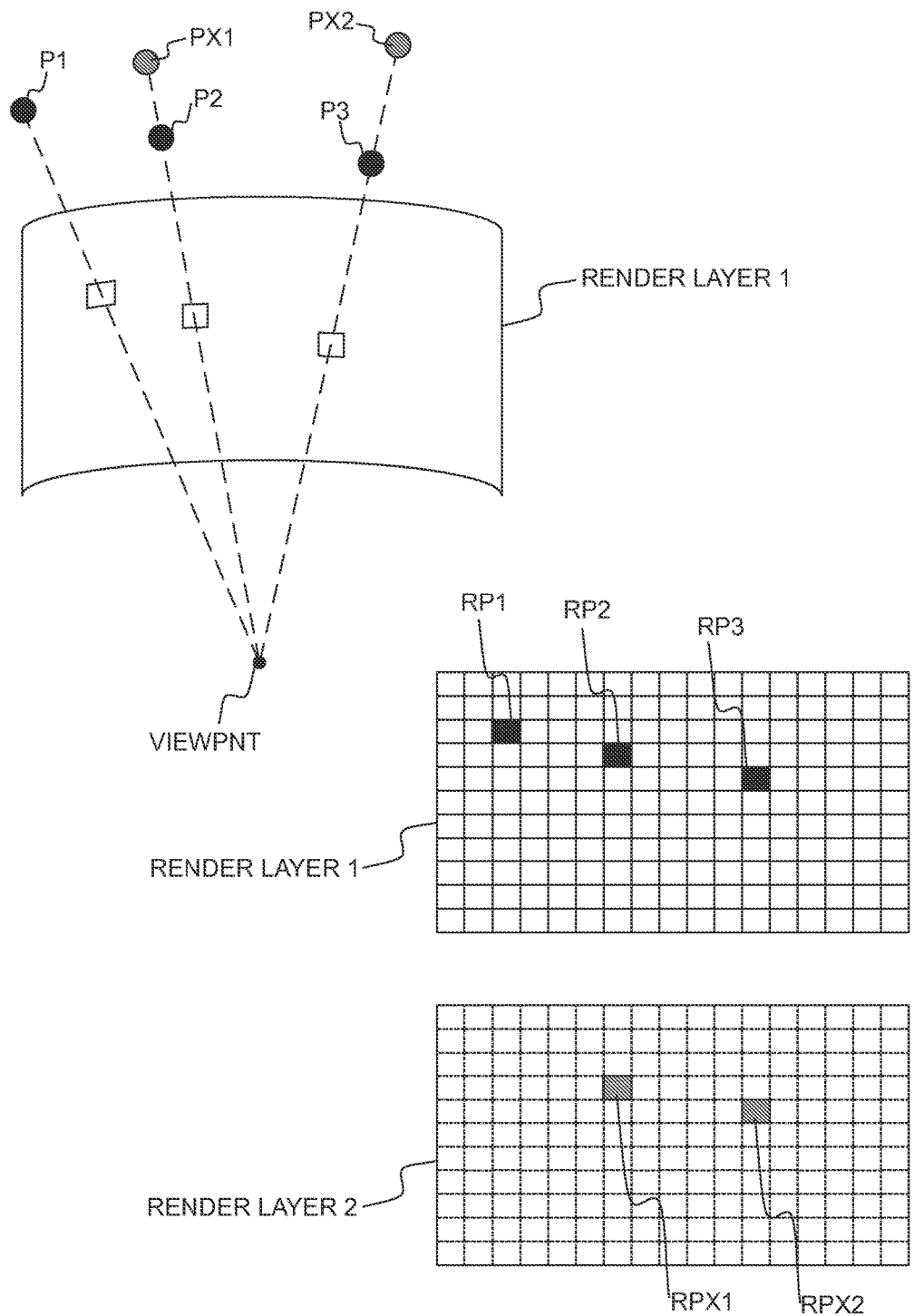
FIGS. 3a and 3b illustrate forming render layers and forming image data for storing.

FIG. 3a illustrates forming render layers and forming image data for storing or transmission. A scene is recorded for storing into a file or for transmission by creating multiple sets of pixels, that is, render layers, with each data point in the layer including at least a vector from a common origin and colour data.

Each data set may be compressed using known 2D image or video sequence compression techniques.

A number of points P1, . . . , PN and PX1, PX2 in FIG. 3a may be formed, each point having colour and a position in space. Points PX1 and PX2 are hidden behind pixels P1, P2 and P3. These points are then converted to render layers so that a first render layer RENDER LAYER 1 is created from the directly visible points when viewing from a viewpoint VIEWPNT, and one or more render layers RENDER LAYER 2 are created at least partially from points that are hidden behind the first render layer. The position vector of each point may be stored or compressed in different ways. It can be simply expressed as 3 independent parameters per point—either a pair of angles and a distance from reference vector (a vector defined by a viewpoint and a view direction), or 3 distances in orthogonal axis direction. Alternatively, a parameterized mapping function can be used to more compactly encode the position vector for each point in space from the origin based upon the index of the point into a sequence of points, interpreted as a 2 dimensional regular layout (image) with known integer width and height, comprising render layer pixels RP1, RP2, RP3 and RPX1, RPX2. This corresponds to render layers RENDER LAYER 1 and RENDER LAYER 2 in FIG. 3a This may for example map x and y coordinates directly to yaw and pitch coordinates, allowing a full sphere to be encoded into a rectangular structure. Pixel colour values for each (yaw,pitch) pixel may be formed by interpolation from the existing point values. Alternatively a circular mapping function may be used such as an equisolid mapping [radius=2*focalLength*sin (angleFromAxis/2)] to map a hemisphere or more to a circular image.

Alternatively a circular mapping function may be used to map the spherical coordinates into 2d cartesian coordinates. These mapping functions create produces a circular image where every x and y value pair can be mapped back to spherical coordinates. The functions map the angle from the optical axis (theta) to the distance of a point from the image circle center (r). For every point the angle around the optical axis (phi) stays the same in spherical coordinates and in the mapped image circle. The relation between x and y coordinates and the r and phi in the mapped image circle is the following: x=x0+r*cos(phi), y=y0+r*sin(phi), where the point (x0,y0) is the center of the image circle.

An example of such mapping function is equisolid which is commonly used in fisheye lenses. The equisolid mapping depends on the focal length (f) of the lens and is the following: r=2*f*sin(theta/2). So for a point that's in the center of the optical axis (theta is 0), r becomes zero and thus the mapped point is also in center of the image circle. For a point that's on a vector perpendicular to the optical axis (theta is 90 degrees), r becomes 1.41*f and the point in the image circle can be calculated as follows: x=x0+1.41*f*cos (phi), y=y0+1.41*f*sin(phi). The x and y can be scaled with constant multipliers to convert the coordinates to pixels in the target resolution. Other mapping functions may be stereographic (r=2*f*tan(theta/2)), equidistant (r=f*theta) and orthographic (r=f*sin(theta)).

Each layer may be fully (that is, without holes, in a continuous way) covering space around the camera, such as RENDER LAYER 1 in FIG. 3a, or it may be sparsely covering space with uncovered parts either totally left out using mapping parameters, or encoded as highly compressible zero values in a larger size, such as RENDER LAYER 2 in FIG. 3a. All objects that may be visualized are recorded in one of the layers. Each layer is supplied with the needed mapping parameters for mapping the two-dimensional image data of a layer into the render space. All layers may be finally packed into a single data structure supplied along with the necessary mapping metadata to decode them. Alternatively, the different layers may be provided in different files or streams, or different data structures.

In addition, the encoding of the layers may allow for scaling of rendering complexity, or reducing delivered data quantity, while still giving good reproduction of the scene. One approach to this is to pack all layers into a 2D image with increasingly distant sub layers located further along one axis, for example along the increasing y axis (down). When less rendering is required, the lower data is simply not delivered, or not decoded/processed, with only the top layer and possibly a limited sub-set of the sub-layers The invention may allow recording, distribution and reproduction of an complex 3D environment with a level of physically realistic behaviour that has not previously been possible other than with a large data processing capacity rendering a fully synthetic scene. This may improve earlier reproduction techniques based on multiple images from different viewpoints by greatly reducing the amount of data that needs to be delivered for a particular image resolution due to the use of the render layer structures.

Figure 3B:
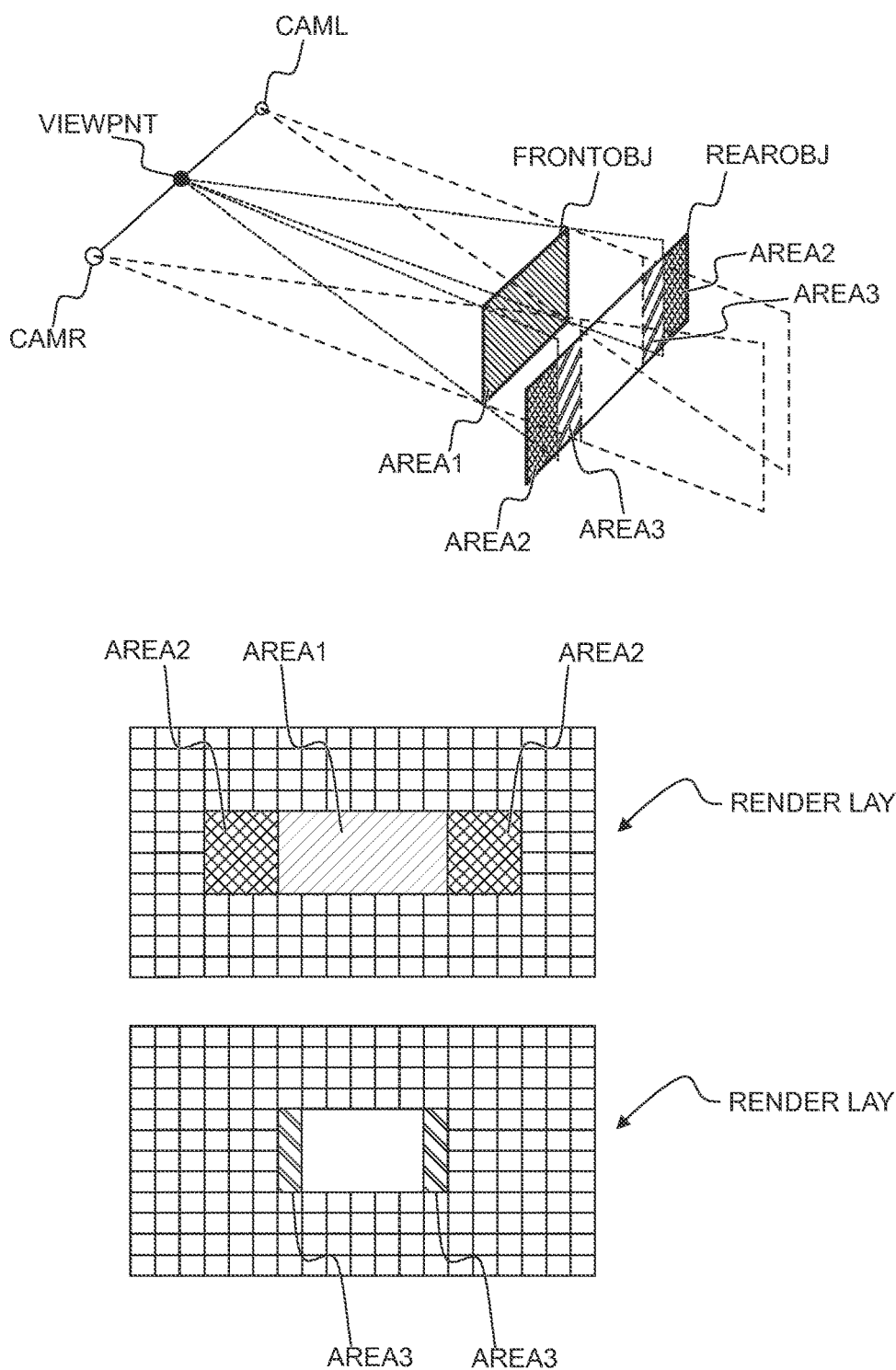

In FIG. 3b the forming of two render layers RENDER LAYER 1 and RENDER LAYER 2 using two cameras CAMR and CAML is illustrated. The different cameras "see" a different part of the object REAROBJ, because the object REAROBJ is hidden behind another object FRONTOBJ. The left camera CAML is able to capture more image information of the object REAROBJ from the left and the right camera CAMR from the right. When the render layers are created, for example by holding the point VIEWPNT as viewpoint, the FRONTOBJ object hides parts of the object REAROBJ for which there is image information, as well as a part for which there is no image information. Consequently, the first render layer RENDER LAYER 1 comprises pixels AREA1 that represent the first object FRONTOBJ and pixels AREA2 that represent the visible part of the second object REAROBJ. The second render layer comprises pixels AREA3 that correspond to the image information of the hidden parts of the second object REAROBJ. The pixels outside AREA3 may be empty, or dummy pixels. Depth information for the render layers may be created as explained earlier.

FIG. 4 illustrates rendering images using render layers. To render a stereo image or a stereo video sequence, image frames for the left and the right eye are formed, as explained earlier. For rendering an image frame, content from all layers RENDER LAYER1, RENDER LAYER2 is projected into one new rendering camera space and sorted by depth to render a correct scene. For example with a conventional graphics processing unit, each render layer point RP1, RP2, . . . , RPN and RPX1, RPX2, . . . may be treated as a "particle" and transformed using a vertex shader program and transformed into 3D render space with a single pixel "point sprite" including a depth value relative to the rendering viewpoint. The depth values for overlapping projected particles are compared and drawn in the correct order with the correct blending functions. This is illustrated by the dashed rectangles corresponding to the points RP1, RP2, RP3, RPX1, RPX2. In such a manner, pixels can be made to be located at places corresponding to the locations of their respective source image points in real space. Opaque content is rendered such that the nearest point to the rendering camera is shown. Non opaque content may be rendered with correct blending of content visible behind it.

It needs to be noticed here that a pixel of a render layer may in the render space represent a different size of an object. A pixel that is far away from the viewpoint (has a large depth value) may represent a larger object than a pixel closer to the viewpoint. This is because the render layer pixels may originally represent a certain spatial "cone" and the image content in that "cone". Depending on how far the bottom of the cone is, the pixel represents a different size of a point in the space. The render layers may be aligned for rendering in such a manner that the pixel grids are essentially in alignment on top of each other when viewed from the render viewpoint.

For transforming the render layers to render space, they may need to be rotated. An example of a rotational transformation $R_x$ of coordinates around the x-axis by an angle $\gamma$ (also known as pitch angle) is defined by a rotational matrix $$R_x = \begin{pmatrix} 1 & 0 & 0 \\ 0 & \cos\gamma & -\sin\gamma \\ 0 & \sin\gamma & \cos\gamma \end{pmatrix}.$$

In a similar manner rotations $R_y$ (for yaw) and $R_z$ (for roll) around the different axes can be formed. As a general rotation, a matrix multiplication of the three rotations by $R=R_x R_y R_z$ can be formed. This rotation matrix can then be used to multiply any vector in a first coordinate system according to $v_2=R\,v_1$ to obtain the vector in the destination coordinate system.

As an example of rotations, when the user turns his head (there is rotation represented by pitch, yaw and roll values), the head orientation of the user may be determined to obtain a new head orientation. This may happen e.g. so that there is a head movement detector in the head-mounted display. When the new head orientation has been determined, the orientation of the view and the location of the virtual eyes may be recomputed so that the rendered images match the new head orientation.

As another example, a correction of a head-mounted camera orientation is explained. A technique used here is to record the capture device orientation and use the orientation information to correct the orientation of the view presented to user—effectively cancelling out the rotation of the capture device during playback—so that the user is in control of the viewing direction, not the capture device. If the viewer instead wishes to experience the original motion of the capture device, the correction may be disabled. If the viewer wishes to experience a less extreme version of the original motion—the correction can be applied dynamically with a filter so that the original motion is followed but more slowly or with smaller deviations from the normal orientation.

For a frame to be displayed, layers can be rendered in multiple render passes, starting from opaque layers and ending with layers containing semitransparent areas. Finally a separate post-processing render pass can be done to interpolate values for empty pixels if needed.

During rendering, the graphics processing (such as OpenGL) depth test is enabled to discard occluded fragments and depth buffer is enabled for writing. Alpha blending is enabled during rendering if rendered layer contains semitransparent areas, otherwise it is disabled. The scene geometry contains a large number of unconnected vertices (GL_POINT) which each correspond to one pixel in the stored render layer data. Depending on the layer storage format, a vertex can have different number of attributes. Vertex attributes are e.g. position (x, y, z), colour, or a texture coordinate pointing to actual layer image data.

OpenGL vertex and fragment processing is explained next as an example. Other rendering technologies may also be used in a similar manner.

Vertex and fragment processing may be slightly different for different layer storage formats. Steps to process a layer stored in a uncompressed list format may be as follows (per vertex):

1. Initially all vertices are allocated and passed to vertex processing stage with their attributes including view angle, colour, and depth relative to common origin (the render viewpoint). If the processed layer has semitransparent content, vertices must be sorted according to their depth values.

2. (Yaw, pitch, depth) representation of the vertex is converted into 3d Cartesian vector (x, y, z).

3. Camera and world transformations are applied to the vertex by multiplying it with corresponding matrices.

4. Vertex colour attribute is passed to fragment processing stage.

5. Final vertex coordinate is written to the output variable (gl_Position)

6. At the fragment processing stage colour data received from vertex processing is written directly into the output variable (gl_FragColor)

The steps to process a layer stored in a compressed image format, that is, the render layers comprising pixels with pixel colour data and depth values, may be as follows (per vertex):

1. Initially all vertices are allocated evenly around the scene having same depth value.

2. If a vertex is not inside the viewer's current field of view, a transform function is applied in order to position it inside the current field of view. A purpose of this transform is to initially concentrate all available vertices into currently visible area. Otherwise the pixel data that is represented by that vertex would be clipped out during rendering at the fragment processing stage. Avoiding clipping in this case improves rendering quality. Position transformation can be done in a way that vertices outside the field of view get distributed evenly inside the field of view. For example, if the field of view is horizontally from 0 degrees to 90 degrees, a vertex which is originally located horizontally at direction 91 degrees would then be transformed into a horizontal position at 1 degrees. Similarly, vertices from horizontal positions at 91 degrees to 180 degrees would be transformed into 1 to 90 degrees range horizontally. Vertical positions can be calculated in the same way. To avoid transformed vertices getting into precisely same position as other vertices that are already inside field of view, a small constant fraction (e.g. in this example case 0.25 pixels) can be added to vertex new position value.

3. Texture coordinate for vertex colour data is calculated from transformed vertex position and it is passed to fragment processing stage.

4. A depth value is fetched for the vertex using a texture lookup from a texture.

5. View angles for vertex are calculated using a mapping function.

6. (Yaw, pitch, depth) depth representation of the vertex is converted into Cartesian 3d vector (x, y, z).

7. Camera and world transformations are applied to the vertex by multiplying it with corresponding matrices.

8. Pixel resolution causes small rounding errors in the final vertex position, this can be taken into account by calculating (sub pixel) rounding error and passing it to the fragment processing stage.

9. Final vertex coordinate is written to the shader output variable (gl_Position)

10. At the fragment processing stage colour data is retrieved from colour texture using received texture coordinate and taking into account sub pixel rounding error value in order to interpolate a more suitable colour value using the surrounding points (this is not possible with the uncompressed list format). Colour value is then written into the output variable (gl_FragColor)

The source pixels may aligned during rendering in such a manner that a first pixel from a first render layer and a second pixel from a second render layer are registered on top of each other by adjusting their position in space by a sub-pixel amount. Depending on the storage format of the render layers, the vertices (pixels) may first be aligned to a kind of a virtual grid (steps 1 and 2, in "compressed" image format), or not. The vertices may finally aligned/positioned in the steps where the camera and world transformations are applied after fetching the correct depth and transforming & mapping the coordinates (step 7). It needs to be understood that alignment may happen in another phase, as well, or as a separate step of its own.

FIG. 5a depicts a data structure comprising render layers for rendering an image. In a non-compressed, list-type format, the various scene points are represented by point data structures each having values for colour (3 values, e.g. red, green, blue), transparency (e.g. alpha channel), position (3 values, e.g. yaw, pitch, depth coordinates) and possibly other attributes.

In FIG. 5b, in image data format, the colour values of scene points in the first render layer are represented by one coded image, the image comprising the colour values for the scene points as render layer pixels RP1, RP2, RP3, or the image comprising colour values that can be used to compute the colour values of the scene points e.g. by texture mapping. In a similar manner, other attributes of the first render layer may be represented as images, e.g. a depth value image comprising depth values RPD1, RPD2, RPD3 of the render layer pixels. The colour values of scene points in the second render layer are represented by one coded image, the image comprising the colour values for the scene points as render layer pixels RPX1, RPX2 or the image comprising colour values that can be used to compute the colour values of the scene points e.g. by texture mapping. Depth values RPDX1, RPDX2 are in the corresponding depth image.

The different render layers may have their own image data structures, or the render layers may be combined together to one or more images. For example, an image may have a segment for the first render layer data, another segment for the second render layer data, and so on. The image may be compressed using conventional image compression technologies.

In addition, the encoding of the layers may allow for scaling of rendering complexity, or reducing delivered data quantity, while still giving good reproduction of the scene. One approach to this is to pack all layers into a 2D image with increasingly distant sub layers located further along one axis, for example along the increasing y axis (down). When less rendering is required, the lower data is simply not delivered, or not decoded/processed, and the rendering is done with only the top layer and possibly a limited sub-set of the sub-layers.

Simple static or dynamic synthetic environments may be rendered in real-time using common 3D graphics processing hardware and techniques in order to create an interactive three-dimensional scene. Also geometrically complex dynamic 3D scenes or models can be recorded or generated and viewed real-time with free viewing direction using known "2D plus depth" techniques. However, it has been noticed here that these techniques may not be feasible in realistic reproduction of reflective or translucent surfaces and objects. Namely, the known techniques rely on storing color values and 3d positions of a number of pixels to be able to reproduce a view with free viewing angle towards those pixels. This makes it possible to move a virtual camera around and render pixels geometrically correctly in 3D space. It has been noticed here that the problem for reproducing a realistic environment in this way is that the color value that was stored does not reflect the reality when the viewing angle changes if the stored pixel is reflective or translucent, which many of the surfaces in the real world more or less are. In real world when looking at a reflective or translucent surface and moving or turning head, the color of the surface changes depending on the viewing angle and what is behind the object or where the reflection is coming from. It has been noticed here that storing a single color value per every pixel in space and rendering those colors regardless of the viewing direction may not reproduce this accurately.

Figure 6A:
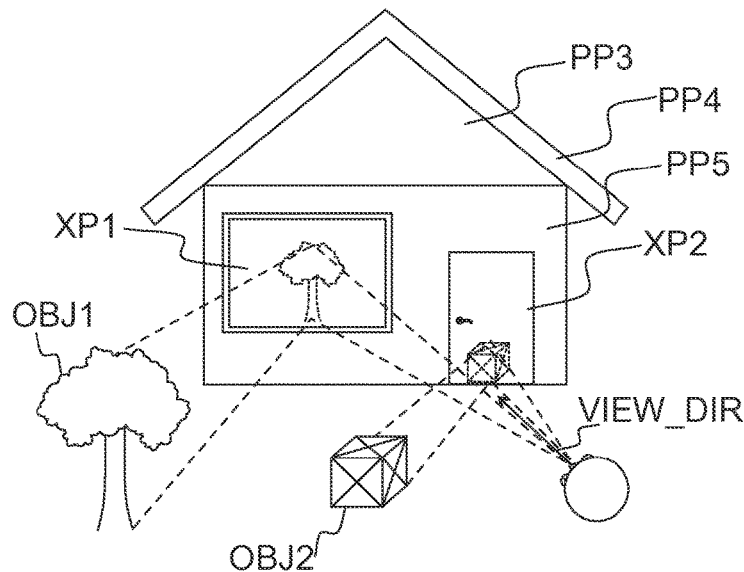
FIG. 6a shows a scene with objects that are partially reflective.

FIG. 6a shows a scene with objects that are partially reflective. In this context, a novel technique is presented for compactly encoding and efficiently reproducing a 3D scene of high complexity. This may be realized by using multiple 2D layers (as described earlier) and, for example, descriptors of transparency and reflectivity of the pixels or fragments on the layers.

As described earlier, a scene like that of FIG. 6a may be recorded by creating multiple sets or layers, with each data point in the layer including a vector from a common origin and color data. In addition to the vector and color, the data points (pixels or fragments) may also include any of a main layer tree transparency, reflected layer tree transparency and a reflected layer tree sub-tree identifier. Each of these data sets (color, transparency, reflectivity, sub-tree identifiers) may be compressed independently using well-known 2D image or video sequence compression techniques.

In FIG. 6a, there are shown a number of graphic objects XP1, XP2, PP3, PP4, PP5, OBJ1 and OBJ2. These graphic objects may directly correspond to real-world objects or objects of a synthetic scene. The graphic objects may have been formed, as described earlier, by modelling the real-world objects. The graphic objects may also correspond to render layers. The graphic objects may also reside on one or more render layers to facilitate realistic rendering of objects that are behind each other in a view direction. In such a manner, render layers may be considered to comprise the graphic objects in FIG. 6a. Yet further, the graphic objects may be individual pixels or groups of pixels. For example, the graphic objects XP1 and XP2 may be individual pixels or groups of pixels in the window and door of FIG. 6a. As described, the graphic objects may be render layers or parts of such, models of graphic objects or parts of such, and/or pixels or groups of pixels. In the following, for simplicity, the graphic objects have been described to correspond to individual real world graphic objects, and it needs to be understood that any other form of graphic object may be used, as well.

In FIG. 6a, in the view direction VIEW_DIR, there are two reflective objects XP1 and XP2 and one translucent object XP1 in view. Due to the reflectivity and the direction of view, object OBJ1 is reflected off the surface XP1 (a glass window), and object OBJ2 is reflected off the surface XP2 (a metal door). These graphic objects thus have a mirror plane, that is, the window and the door are planar objects and the planes coinciding with the surfaces may be understood to be mirror planes of these objects. In addition, although not shown, objects inside the house may be visible through the window. The window may also have a colour, e.g. a green tint. In other words, in a rendering method as described here, there may be information of a first graphic object (one or more of its fragments) like the window XP1 and information of a second graphic object (the fragments of the tree OBJ1 reflected off the window) so that the graphic fragments making up one of the objects (e.g. the window) are special fragments through which fragments of another graphic object are visible (the image of the tree and any objects inside the house).

For rendering, content from all layers is projected into one new rendering camera space and sorted by depth to render a correct scene. For example with a conventional graphics processing unit, each point may be treated as a "particle" (one type of fragment) and transformed using a vertex shader program and transformed into 3D space with a single pixel "point sprite" including a depth value relative to the rendering camera. The depth values for overlapping projected particles are compared and drawn in the correct order with the correct blending functions. Opaque content is rendered such that only the nearest point to the rendering camera is shown. This is sufficient for all objects that are not transparent or reflective.

For the render layers and in general any graphic objects, mapping information is used to place the graphic object into the rendering space. That is, there is information given on how the X and Y coordinates of a render layer are transformed to the three-dimensional rendering space (see FIG. 4). Different mapping functions may be used, as has been described in the context of FIG. 4, for example. Also, clipping information may be used as part of the mapping information such that information is given on the range of the mapping. In this manner, for example, the whole sphere may not need to be coded, because the graphic object can be limited by clipping, and no information is needed outside the clipping area. Each moment in time may be encoded with a new set of layers and mapping parameters, to allow time-based playback of changes in the 3D environment. In each frame, new layer data and mapping information is taken into use. Alternatively, time-based playback can be paused and a single frame can be used and rendered from different positions.

Figures 6B, 6C:
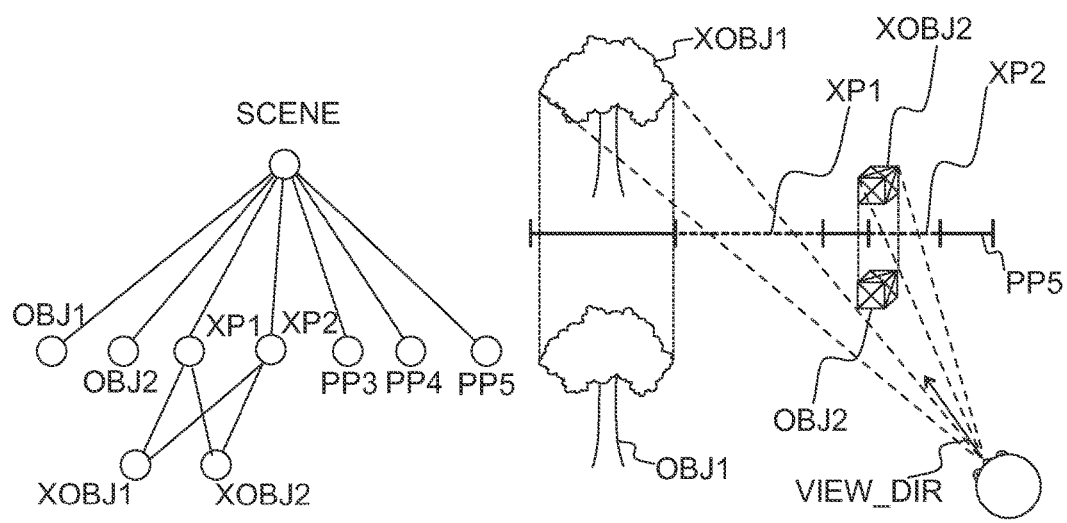
FIG. 6b shows a dependency graph for rendering reflective and translucent objects.
FIG. 6c illustrates rendering reflected objects.

FIG. 6b shows a dependency graph for rendering reflective and translucent objects. Translucent content needs to be rendered with blending of content visible through it. For simple semi-transparent objects such as a tinted window a transparency value on the main level of the dependency graph is used for blending. Any objects visible through the transparent object are in a transparency sub-tree of the transparent object. A reflected layer tree transparency value may be used for blending with the reflection sub-tree instead of (for rendering reflection only, e.g. a non-transparent mirror) or in addition to (reflection plus transparency, e.g. a window) the primary tree of layers. Information of the reflectivity and/or translucence may be stored with the color information for each pixel, for example in a render layer data structure. Alternatively or in addition, information of the reflectivity and/or translucence affecting the dependent objects may be stored in the data structure of the graph, e.g. so that the link between two objects in the graph contains the reflectivity and translucence information. The reflectivity and translucence (transparency) may for example be given using a first alpha value for transparency and a second alpha value for reflectivity.

In FIG. 6b, the scene is represented in a dependency graph data structure. The dependency graph may e.g. be a tree structure. The regular graphic objects PP3, PP4, PP5, OBJ1, OBJ2 of the scene have their nodes directly dependent on the scene root node. Such objects may also reside in a tree structure of render layers, for rendering in a layer-based rendering method, as has been described earlier. For example, the graphic objects may be or may reside on render layers, and the render layers may be dependent on each other in a tree structure. That is, the depencency graph may comprise render layers (as nodes of the graph) and dependency links between the render layers. Transparent and/or reflective objects XP1, XP2 have their nodes also depending on the main scene root node. Objects XOBJ1, XOBJ2 that are visible only through these transparent and/or reflective objects have nodes that are dependent on the nodes of the object that they are visible through. For regular objects visible through a transparent object, such as objects inside the house in FIG. 6a, the object may have a directly corresponding node that is a child node of the transparent object. Objects that are reflected off a reflective surface may have a mirror object XOBJ1, XOBJ2 (see FIG. 6c for the mirror objects) that has a node dependent on the reflective object. In FIG. 6b, object OBJ1 is reflected off the window XP1, and thus the mirror object XOBJ1 corresponding to the regular object OBJ1 has a node that is dependent on the node of the window XP1. Likewise, object OBJ2 is reflected off the door XP2, and thus the mirror object XOBJ2 corresponding to the regular object OBJ2 has a node that is dependent on the node of the door XP2.

In FIG. 6b, it needs to be noted that object OBJ1 may also be reflected off the object XP2, and the objects OBJ2 may be reflected off the object XP1, if the viewing angle is suitable for the reflection. For this reason, XOBJ1 may also be a child node of XP2 and XOBJ2 may be a child node of XP1. In other words, the dependency tree may be a network, more particularly a directed network. Alternatively, the directed network may be expanded to a tree structure, for example in FIG. 6b so that XOBJ1 and XOBJ2 depend on XP1, and replicas of XOBJ1 and XOBJ2 depend on XP2. In FIG. 6b, the dependency graph is a directed network structure where dependency direction is from top to down. The graph may also be a directed (loop-free) network that allows to determine for each reflective and/or transparent object the objects that are visible through them. When the objects are rendered, the rendering may then happen so that first, a second graphic object (child node) is rendered by creating pixel data for the corresponding rendered pixels using information of the second graphic object (e.g. colour) and also information of the first graphic object (colour, transparency, reflectivity). Then, for example in another rendering pass, the first (mother node) graphic object is rendered first by creating pixel data for rendered pixels using information of the first graphic object such as colour information. In such an arrangement, the pixels of the second object form a subset of the pixels of the first object (pixel subset in this context meaning none, some or all of the pixels of the first object). Pixels corresponding to the second object are not rendered outside the first object, unless of course the second object is visible also through another object than the first one. In other words, visibility of objects is restricted outside other objects by the dependency information such that some objects are visible only through other objects and not outside the other objects. In other words, the dependency graph may be a dependency tree, and the first and second graphic objects correspond to first and second nodes of the dependency tree, respectively, such that the second node is a child node of the first node, and the dependency tree determines that the second object is only visible through the first object but not otherwise.

FIG. 6c illustrates rendering reflected objects. As explained earlier, the data for objects (e.g. the render layers) may be generated straightforwardly from a complex synthetic model (such as a CGI film content model) using potentially a large amount of processing to render the world from a single viewpoint into a suitable format for rendering, e.g. the earlier described layer format with an arbitrary number of obscured pixels being stored in subsidiary layers and layer trees. Alternatively, the scene data may be captured from a real scene using multiple cameras at different locations, with pairs of cameras being used to create estimates of depth for every point matching in both images. The point estimates are mapped into a common origin and orientation, and duplicate entries removed by comparing their color and position values. In such a manner, render layers may be obtained, and such render layers may be used as graphic objects in rendering.

In FIG. 6c, the forming of image objects for rendering is illustrated for the tree object OBJ1 and the box object OBJ2. The tree object OBJ1 is reflected off the window object XP1, and thus an image object XOBJ1 for the tree object is formed by mirroring the tree object OBJ1 with respect to the mirror plane of the window object. In this manner, the mirror object XOBJ1 is placed "inside" the house, and will only be visible through the area of the reflective window XP1. Similarly, the mirror object XOBJ2 of the box is formed by using the plane of the door XP2 as a mirror plane. When rendering, the dependencies of these mirror objects XOBJ1 and XOBJ2 from the other objects XP1 and XP2, respectively, is employed for rendering of the mirror objects by using the dependency graph and the transparency/reflectance information for the parent objects. In the rendering, the color information of the front object is blended with the color information of the back object depending on the transparency/reflectivity of the front object.

Generation of data for transparent and reflective objects from real world images may be carried out by forming an estimate for the surface color and translucency (alpha) of each front object as well as the reflected layer-tree objects visible through it. This may be achieved by comparing data from multiple viewpoints to differentiate both the distances of different items and their colors. For example, in FIG. 6c, the mirror image object XOBJ1 may be formed directly by comparing two or more images and isolating the reflection of the tree OBJ1 from the window.

A computerized method for rendering digital image data according to the above is described next. In the method, information of a first graphic object and a second graphic object is received for rendering the second graphic object. Also, dependency information between the first and second graphic objects is received, wherein the dependency information comprises information for rendering the second graphic object depending on overlapping of the first graphic object and the second graphic object in a viewing direction. Then, the second graphic object is rendered by creating pixel data using information of the second graphic object and information of the first graphic object, wherein the rendering is carried out for such part of the second graphic object that is overlapped by the first graphic object in the viewing direction. In other words, in the method, the visibility dependency of the second graphic object (e.g. the mirror image graphic object) is used to render the second graphic object within the boundaries of the first graphic object. The rendering of the second graphic object may comprise using reflectance information of the first graphic object for determining transparency of the first graphic object for rendering the second graphic object through the first graphic object. That is, the reflectance of the first object for reflecting the image of the second object is used to determine the transparency of the first object when the mirror image object is used to render the reflection. The second graphic object may be a mirror image of a third object, and information for the second graphic object may be formed by mirroring a third object (the real object that is reflected from the surface) with respect to a mirror plane of the first graphic object. The mirror plane may be any plane approximating the surface of the first object.

In the above, the first graphic object may be e.g. a first render layer, and the second graphic object (visible through the first graphic object) may be a second render layer. Alternatively, the first graphic object may be a pixel or a group of pixels, e.g. of a first render layer. The second graphic object may be a pixel or a group of pixels, e.g. of a second render layer. In this manner, the rendering process may comprise determining which part of a second render layer is visible through a pixel of a first render layer. The rendering may naturally be repeated for as many pixels of the first render layer as necessary.

For example, the first graphic object may comprise a first pixel and the second graphic object may comprise a render layer, and it may be determined whether the first pixel is a portal pixel through which the second graphic object is visible, and the first pixel may then be rendered using first information of the first graphic object and second information of the second graphic object in case the determining indicates said first pixel is a portal pixel. A portal object or a portal pixel is such a graphic object that comprises a special region through which the second object is visible so that the second object is not visible outside the portal object (except if there are other portal objects through which the second object is visible).

More realistic recording, distribution and reproduction of a complex 3D environment with reflections and semi-transparent surfaces may be facilitated by the described method and equipment due to the presence of reflections. For 3D viewing, the reflections are generated such that they appear in different locations for the left and right eye images according to the parallax, and this adds realism to the 3D images.

Figure 6D:
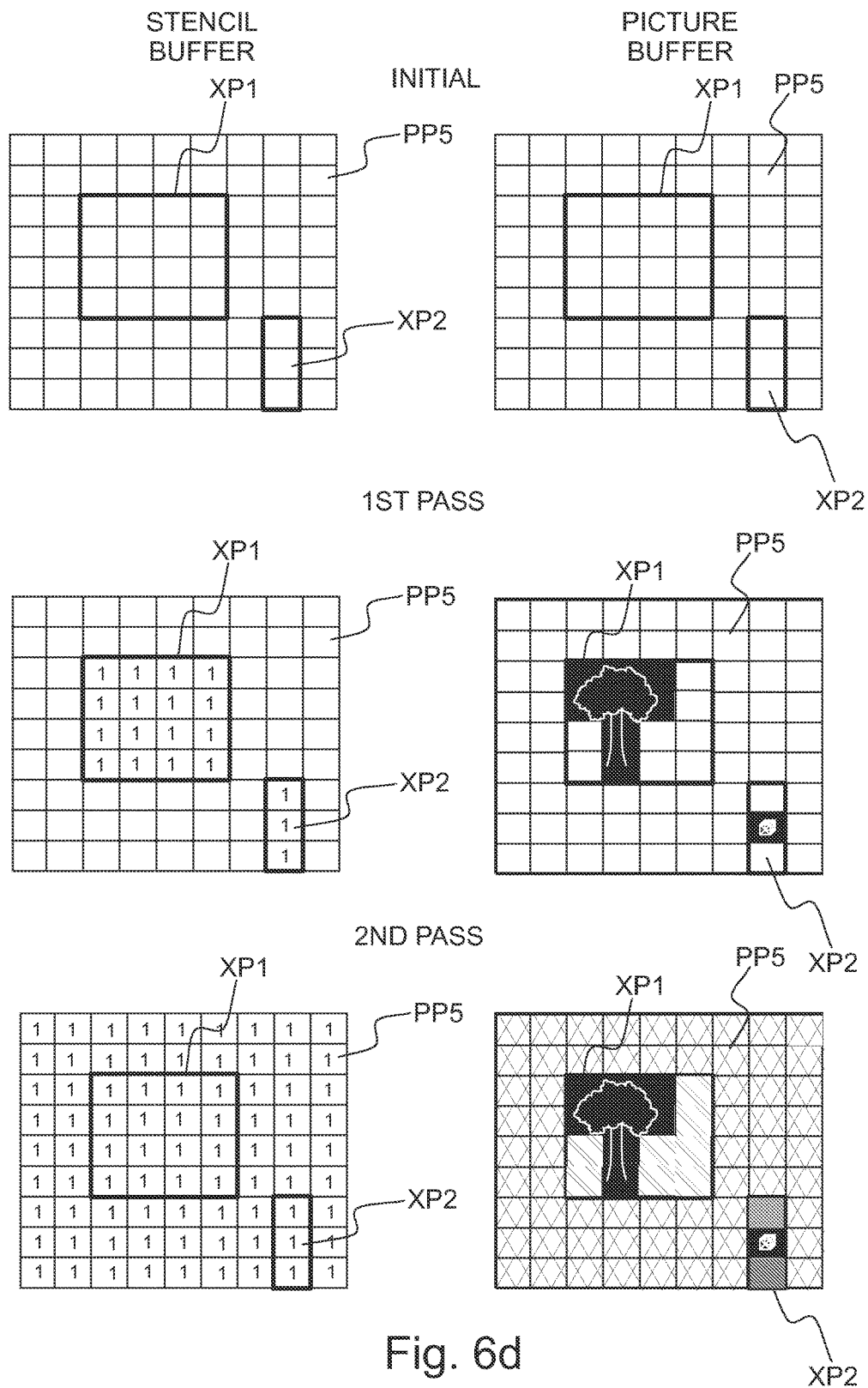
FIG. 6d illustrates using a stencil buffer for rendering reflected objects.

FIG. 6d illustrates using a stencil buffer for rendering reflected objects. The sub tree identifier for rendering reflective and transparent objects and the reflectance transparency value may be stored for each pixel and then rendered using additional passes combined with stencil operations to manage visibility of the sub-tree in the view. This ensures that content within mirrors is only visible when looking through the mirrors, and not when looking behind them, as in a real physical environment.

This process is illustrated in FIG. 6d by showing exemplary contents of the stencil buffer (left column) and the picture buffer (right column) as rendering progresses through two passes. Initially, the stencil buffer and the picture buffer are empty (no pixel data or zero). The pixels to be rendered may be identified by determining the sub-tree identifier to which they belong which depends on the dependency information as in FIG. 6b. For example, "wall" pixels in the regular objects of FIG. 6a that are non-reflective are shown in FIG. 6d as pixels PP5 outside the "window" pixels XP1 and "door" pixels XP2.

It is also possible to render all pixels in the first pass, and then mark the pixels in the stencil buffer that are to be re-rendered. This may ensure that no holes appear in the picture. Pixels falling within reflective/transparent objects are marked with their respective sub-tree identifier, e.g. "2" and "3". The determination of which pixels fall within which objects may be carried out as regular graphic processor operation.

In the first pass, pixels falling within the reflective/transparent objects XP1 and XP2 are first marked to the stencil buffer. Then, the pixels for the objects XOBJ1 (mirror image of "tree" overlapped by "window" XP1) and XOBJ2 (mirror image of "box" overlapped by "door" XP2) are rendered. If there are objects dependent on the objects XOBJ1 and XOBJ2, the dependent objects are rendered first. The stencil buffer is used in the rendering so that only those pixels of the picture buffer are rendered (computed and stored in the picture buffer) that are marked to be rendered in the stencil buffer, in this case the pixels overlapped by XP1 and XP2. Thus, only the pixels falling inside objects XP1 and XP2 are rendered in this pass, and consequently any part of objects XOBJ1 and XOBJ2 that falls outside of the objects XP1 and XP2 in viewing direction, is not rendered. That is, for example the tree OBJ1 is only reflected from the window but not the wall, and the tree OBJ1 cannot be seen anywhere else except through the window XP1. In other words, in the method for rendering, pixels to be rendered may be marked using a stencil buffer, and the second graphic object may be rendered by creating pixel data corresponding to the marking of said stencil buffer.

In the second pass, pixels marked with "1" are processed in FIG. 6d to render the pixels of the objects PP5, XP1 and XP2. Rendering the non-reflective and non-transparent pixels of PP5 may take place by determining color values of each pixel using the graphic model, e.g. render layers, as has been described earlier. Reflective and transparent objects are rendered by using information of both the object itself and the other object visible through it. For example, the rendering of the mirror image object XOBJ1 through the object XP1 may take place as regular blending of pixel color values of XOBJ1 and XP1. That is, pixel data may be formed by blending color information from the first graphic object (e.g. tinted glass of "window" XP1) and color information from the second graphic object (colors of the mirror image of "tree" XOBJ1). In the second pass, information of objects that are visible through the first graphic object have already been computed into the picture buffer, and blending may thus happen by taking the pixel color value from the picture buffer, the computed pixel color value of the first graphic object and blending them appropriately (taking a weighted average of the pixel color values).

In the above, the setting and use of the stencil buffer may be carried out as follows. In those rendering passes that are done for rendering objects visible through other objects, those pixels of the front graphic object that can be seen through (reflective and/or transparent pixels) are marked to the stencil buffer. That is, opaque pixels of the front object may not be rendered until the final pass (or final passes). The stencil buffer is then set simply by writing a value into the stencil buffer pixel. The writing may happen by overwriting, by addition or by logical operation. In this manner, certain bits of the value of the pixel may serve as one parameter and other bits may be used for other purposes. The writing of the stencil buffer may happen in a parallel manner so that a simple test (e.g. comparison) is carried out for each pixel and a value is written dependent on the outcome of the test. The stencil buffer may be used in the rendering so that if a stencil buffer pixels meets a certain logical criterion, e.g. "equals 1" or "is greater than 4", the corresponding pixel is rendered to the picture buffer.

It needs to be understood in the above that reflective objects may be rendered within other reflective objects by using multi-level dependency (FIG. 6c) and carrying out multiple passes, wherein an additional reflection is added in an additional pass to the pixel values.

The rendering of 3D images may take place so that the objects are rendered as render layers, as described earlier. In such case, the method may comprise receiving a first render layer comprising the first graphic object and a second render layer comprising the second graphic object, the first and second render layer comprising pixels. The first render layer comprises pixels corresponding to the first graphic object viewed from a rendering viewpoint and the second render layer comprising pixels corresponding to the second graphic object viewed from said rendering viewpoint, wherein the second graphic object is at least partly obscured by the first object viewed from the rendering viewpoint. The pixels of the first render layer and the pixels of the second render layer are placed in a rendering space, depth value is associated with the pixels, and a left eye image and a right eye image are rendered using the pixels and the depth values.

FIGS. 7a and 7b show flow charts for forming and rendering a digital scene with reflective objects. In phase 710, a first graphic object for rendering is formed. The graphic object is formed by describing its geometry e.g. in terms of vertices, triangles and surface normal, as is customary, as well as giving texture properties like color information. In addition, transparency and reflectivity of the first object is given so that e.g. reflections of other objects can be determined. In phase 720, a second graphic object is formed. This second graphic object may be a mirror image graphic object corresponding to a real graphic object in the scene. As described earlier, this mirror image may be formed by mirroring the real object with respect to a mirror plane corresponding to the first object. In phase 730, dependency information between the first and second objects is formed. As explained earlier, this may take place in the form of a dependency graph (such as a dependency tree), wherein it is indicated that the second graphic object is only visible through the first object. In phase 740, the data of the graphic objects, and their dependency is output e.g. to a file or to a transmission channel to be transmitted to a rendering device.

In FIG. 7b, the information of the graphic objects and the dependency are received from a file or from a transmission channel. The term "receiving" is understood here to mean that the information is read from a memory or received over a communications connection and then formed in the working memory of the rendering device for the purpose of rendering. In phase 750, information (geometry, color, transparency, reflectivity) of the first and second graphic objects is received. In phase 760, dependency information between the first and second graphic object is received. The first graphic object can be rendered based on the information on the first graphic object. In phase 770, the second graphic object is rendered for the part that is covered by the first graphic object such that the second graphic object is not visible outside the first graphic object. In this phase, the color information of the first and second graphic objects may be blended e.g. by alpha blending or another blending algorithm to form the output pixels. In phase 780, the resulting pixel data is output for the purpose of storing into a file or for display on a screen. The pixels may be compressed in an image format (or video format). The pixel data may be in the form of actual pixels, or the pixel data may be output in the form of graphic primitives and texture information.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

It is obvious that the present invention is not limited solely to the above-presented embodiments, but it can be modified within the scope of the appended claims.

The invention claimed is:

1. A method, comprising:
   receiving first information of a first graphic object for rendering a second graphic object;
   receiving second information of said second graphic object for rendering said second graphic object;
   receiving dependency information between said first and second graphic objects, said dependency information comprising information for rendering said second graphic object depending on overlapping of said first graphic object and said second graphic object in a viewing direction; and
   rendering said second graphic object by creating second pixel data using said second information of said second graphic object and said first information of said first graphic object, wherein said rendering of said second graphic object is carried out for such part of said second graphic object that is overlapped by said first graphic object in said viewing direction.

2. The method according to claim 1, wherein rendering said second graphic object comprises using reflectance information of said first graphic object for determining transparency of said first graphic object in rendering said second graphic object through said first graphic object.

3. The method according to claim 1, wherein said second graphic object is a mirror image of a third object, and said method comprises:
   forming said second information of said second graphic object by mirroring said third object with respect to a mirror plane of said first graphic object.

4. The method according to claim 1, wherein said dependency information is a dependency graph indicating visibility of graphic objects through other graphic objects, and said method comprises:
   rendering said first graphic object by creating first pixel data for first pixels using said first information of said first graphic object;
   rendering said second graphic object by creating second pixel data for second pixels using said second information of said second graphic object and said first information of said first graphic object and said second pixels are a subset of said first pixels.

5. The method according to claim 4, comprising:
   marking second pixels to be rendered using a stencil buffer; and
   rendering said second graphic object by creating pixel data corresponding to said marking of said stencil buffer.

6. The method according to claim 1, wherein said first graphic object comprises a first pixel and said second graphic object comprises a render layer, and said method comprises:
   determining whether said first pixel is a portal pixel through which said second graphic object is visible; and
   rendering said first pixel using said first information and said second information in case said determining indicates said first pixel is a portal pixel.

7. The method according to claim 1, wherein visibility of objects is restricted outside other objects by said dependency information such that some objects are visible only through other objects and not outside other objects and said method comprises forming said second pixel data by blending color information from said first graphic object and color information from said second graphic object.

8. The method according to claim 1, wherein said dependency information is a dependency tree, said first and second graphic objects corresponding to first and second nodes of said dependency tree, respectively, such that said second node is a child node of said first node, and said dependency tree determining that said second object is only visible through said first object but not otherwise.

9. The method according to claim 1, wherein said first and second information comprises information of one or more graphic fragments of said first and second graphic object, and one or more graphic fragments of said first graphic object are special fragments through which fragments of said second graphic object are visible.

10. The method according to claim 1, comprising:
    receiving a first render layer comprising said first graphic object and a second render layer comprising said second graphic object, said first and second render layer comprising pixels, said first render layer comprising pixels corresponding said first graphic object viewed from a rendering viewpoint and said second render layer comprising pixels corresponding to said second graphic object viewed from said rendering viewpoint, wherein said second graphic object is partly obscured by said first graphic object viewed from said rendering viewpoint;

placing pixels of said first render layer and pixels of said second render layer in a rendering space;

associating a depth value with said pixels; and rendering a left eye image and a right eye image using said pixels and said depth values.

11. An apparatus comprising at least one processor, memory including computer program code, the memory and the computer program code configured to, with the at least one processor, cause the apparatus to perform at least the following:

receive first information of a first graphic object for rendering a second graphic object;

receive second information of said second graphic object for rendering said second graphic object;

receive dependency information between said first and second graphic objects, said dependency information comprising information for rendering said second graphic object depending on overlapping of said first graphic object and said second graphic object in a viewing direction; and render said second graphic object by creating second pixel data using said second information of said second graphic object and said first information of said first graphic object, wherein said rendering of said second graphic object is carried out for such part of said second graphic object that is overlapped by said first graphic object in said viewing direction.

12. The apparatus according to claim 11, wherein rendering said second graphic object is arranged to comprise using reflectance information of said first graphic object for determining transparency of said first graphic object in rendering said second graphic object through said first graphic object.

13. The apparatus according to claim 11, wherein said second graphic object is a mirror image of a third object, and said apparatus comprises computer program code to cause the apparatus to:

form said second information of said second graphic object by mirroring said third object with respect to a mirror plane of said first graphic object.

14. The apparatus according to claim 11, wherein said dependency information is a dependency graph indicating visibility of graphic objects through other graphic objects, and said apparatus comprises computer program code to cause the apparatus to:

render said first graphic object by creating first pixel data for first pixels using said first information of said first graphic object;

render said second graphic object by creating second pixel data for second pixels using said second information of said second graphic object and said first information of said first graphic object and said second pixels are a subset of said first pixels.

15. The apparatus according to claim 14, comprising computer program code to cause the apparatus to:

mark second pixels to be rendered using a stencil buffer; and render said second graphic object by creating pixel data corresponding to said marking of said stencil buffer.

16. The apparatus according to claim 11, wherein said first graphic object comprises a first pixel and said second graphic object comprises a render layer, and said apparatus comprises computer program code to cause the apparatus to:

determine whether said first pixel is a portal pixel through which said second graphic object is visible; and render said first pixel using said first information and said second information in case said determining indicates said first pixel is a portal pixel.

17. The apparatus according to claim 11, wherein visibility of objects is arranged to be restricted outside other objects by said dependency information such that some objects are visible only through other objects and not outside other objects and said apparatus comprises computer program code to cause the apparatus to form said second pixel data by blending color information from said first graphic object and color information from said second graphic object.

18. The apparatus according to claim 11, wherein said dependency information is a dependency tree, said first and second graphic objects corresponding to first and second nodes of said dependency tree, respectively, such that said second node is a child node of said first node, and said dependency tree determining that said second object is only visible through said first object but not otherwise.

19. The apparatus according to claim 11, wherein said first and second information comprises information of one or more graphic fragments of said first and second graphic object, and one or more graphic fragments of said first graphic object are special fragments through which fragments of said second graphic object are visible.

20. The apparatus according to claim 11, comprising computer program code to cause the apparatus to:

receive a first render layer comprising said first graphic object and a second render layer comprising said second graphic object, said first and second render layer comprising pixels, said first render layer comprising pixels corresponding said first graphic object viewed from a rendering viewpoint and said second render layer comprising pixels corresponding to said second graphic object viewed from said rendering viewpoint, wherein said second graphic object is partly obscured by said first graphic object viewed from said rendering viewpoint;

place pixels of said first render layer and pixels of said second render layer in a rendering space;

associate a depth value with said pixels; and render a left eye image and a right eye image using said pixels and said depth values.

* * * * *